Patented Dec. 18, 1951

UNITED STATES PATENT OFFICE

2,578,660

PROCESS FOR POLYMERIZING ETHYLENE GLYCOL TEREPHTHALATE

Lawrence Arthur Auspos, Tonawanda, N. Y., and Jane Bowen Dempster, Woodbury, N. J., assignors to E. I. du Pont de Nemours & Company, Wilmington, Del., a corporation of Delaware No Drawing. Application September 21, 1949,
Serial No. 117,077

2 Claims. (Cl. 260—75)

This invention relates to an improved method for the manufacture of polymeric glycol terephthalates and more particularly to such a method which employs a novel and effective catalyst in the reaction mixture.

Glycol esters of terephthalic acid in their polymerized form have assumed practical importance. The ethylene glycol ester of terephthalic acid, for example, prepared by the alcoholysis reaction of a lower alkyl ester of terephthalic acid with ethylene glycol, may subsequently be polymerized to form a material possessing properties that adapt it for use as an industrial fiber. In effecting the foregoing alcoholysis and polymerization procedures, catalysts have been necessary to accelerate the reactions and increase the conversions. Catalysts have heretofore been chosen particularly with reference to the alcoholysis reaction, wherein those catalysts effecting rapid and complete conversion and yet imparting no undesirable color to the polymer subsequently prepared from the alcoholysis product have been the most desirable. These catalysts, however, have not always been effective in yielding a polymer of entirely satisfactory properties, particularly with respect to viscosity, from the monomeric ethylene glycol ester of terephthalic acid formed by their aid.

An object of the present invention is a novel and improved process for the manufacture of polymeric glycol terephthalates from the product of a glycol alcoholysis of terephthalic acid or a lower alkyl ester thereof, whereby satisfactory speed of reaction is attained and a product results that possesses a high degree of viscosity. A further object is such a process wherein a novel catalytic material is employed to accomplish the improvement. A still further object is an effective catalytic polymerization of monomeric ethylene glycol terephthalate wherein the catalyst used does not have a detrimental effect on the color of the finished polymer. Additional objects will be disclosed as the invention is described in detail in the following.

We have found that the foregoing objects are accomplished when the monomeric glycol terephthalate prepared by alcoholysis of terephthalic acid or its lower alkyl esters with a glycol by the aid of catalysts known to the art is polymerized by means of heat, the heating being carried out in the presence of a germanium-containing material as catalyst. The germanium-containing material is advantageously added to the reaction mixture of glycol and acid or ester after the otherwise catalyzed alcoholysis reaction has been completed and before the temperature is brought up to the degree necessary to effect polymerization. A number of forms of germanium may be used, but ordinarily it will be employed as one of its oxides or in metallic form.

In carrying out the process, the effect of various catalysts was determined by the following procedure. The desired amounts of dimethyl terephthalate and ethylene glycol were introduced into a small distillation flask, and the alcoholysis catalyst was added. The flask was heated for several hours and the methanol distilled over was collected, the amount formed being taken as an indication of the percentage completion of the alcoholysis reaction. In the preparation of the monomer, the vapors distilling over were not allowed to exceed 70–75° C., and the temperatures of the contents were maintained at 210–220° C. or below. The monomer was then introduced directly in measured amount into a polymerization tube of 25 mm. outside diameter, and the polymerization catalyst was added. The tube was provided with a side arm for distillation purposes, and a capillary extended nearly to the bottom of the tube, through which pure, dry nitrogen gas was introduced. A flask was connected to the side arm to collect the distillate, this flask being provided with a vacuum pump connection. The tube was then heated and the excess glycol distilled over. With full vacuum in the system, the contents were heated at 265° C. for several hours. After the polymerization cycle was completed a comparative measurement of the color of the polymer was made, and the viscosity was determined.

Following the foregoing procedure the catalysts of the present invention were shown to give superior results with respect to quality of the product as determined by the viscosity and the color of the polymer produced.

| Polymerization Catalyst GeO$_2$, Per Cent by Wt.[1] | Alcoholysis Catalysts | | | | Intrinsic Visc. of Polymer[2] | Intrinsic Visc. of Control Polymer[3] |
|---|---|---|---|---|---|---|
| | First | Amt., Per Cent by Wt.[1] | Second | Amt., Per Cent by Wt.[1] | | |
| 0.01 | CaH$_2$ | 0.01 | | | 0.32 | 0.07–0.18 |
| 0.01 | CaO | 0.01 | Pb terephthalate | 0.01 | 0.64 | 0.38 |
| 0.01 | MnO$_2$ | 0.01 | | | 0.67 | 0.34 |
| 0.01 | CaO | 0.01 | Pb terephthalate | 0.01 | 0.64 | 0.38 |
| 0.005 | Zn | 0.005 | | | 0.78 | 0.46 |
| 0.005 | Mn terephthalate | 0.01 | | | 0.68 | 0.28–0.35 |

[1] The amount of catalyst is expressed in per cent by weight of the glycol terephthalate used.
[2] After polymerization for a constant time.
[3] Polymers obtained in comparable runs with the same alcoholysis catalysts but without added polymerization catalyst.

The foregoing table shows that the use of germanium dioxide is decidedly advantageous from the viewpoint of viscosity of the material after polymerization. The use of germanium dioxide is also advantageous in that the color of the finished polymer is not adversely affected thereby; in most cases the color is appreciably improved over that of polymers catalyzed by litharge (PbO), the catalyst preferred heretofore. In the determination cited in the foregoing table, where zinc was used as the alcoholysis catalyst, the color of the polymer produced was determined to be better than that of a polymer produced by the use of litharge as the sole catalyst under otherwise similar conditions.

The amount of catalyst is not a limiting factor; generally it is found desirable to employ more than 0.001% of the weight of the terephthalic acid or its ester. An amount of catalyst in excess of 0.05% will generally be unnecessary and undesirable.

The catalyst of the present invention functions in the formation of polymeric glycol terephthalates as accelerants of the reaction and as materials that allow the obtaining of a product of high viscosity that is substantially free from color.

Ethylene glycol has been used in the examples cited and will ordinarily be the preferred diol because of its availability and the desirable products obtained. Other glycols may be employed, however, of the general formula $$HO-(CH_2)_n-OH$$

where $n$ is a number greater than 2 and not greater than 10. Such other glycols will include diethylene glycol; 2,2-dimethyl-1,4-propanediol sometimes designated pentaglycol; and the like.

Where the term lower alkyl esters is used, moreover, we intend this to include only esters of alcohols containing not more than four carbon atoms. In addition to dimethyl terephthalate, therefore, such esters as diethyl and dibutyl terephthalates are within the scope of the invention.

The invention has been described adequately in the foregoing. It will be understood, however, that many variations may be introduced in details of procedures, quantities and specific formulas of reactants, without departure from the scope of the invention. We wish to be limited, therefore, only by the following claims.

We claim:

1. A process for the manufacture of polymeric ethylene glycol teraphthalate, which comprises polymerizing monomeric ethylene glycol terephthalate in the presence of a catalyst taken from the class consisting of germanium and germanium oxide.

2. A process for the manufacture of a polymeric glycol teraphthalate, which comprises polymerizing a monomeric glycol terephthalate in the presence of a catalyst taken from the class consisting of germanium and germanium oxide.

LAWRENCE ARTHUR AUSPOS.
JANE BOWEN DEMPSTER.

REFERENCES CITED

The following references are of record in the file of this patent:

UNITED STATES PATENTS

| Number | Name | Date |
|---|---|---|
| 2,465,319 | Whinfield et al. | Mar. 22, 1949 |